United States Patent [19]

Kaiserman

[11] 4,122,237

[45] Oct. 24, 1978

[54] DOUBLE IMAGE PRINTED MEMBER

[76] Inventor: Terrance Z. Kaiserman, 3725 NW. 41st St., Miami, Fla. 33142

[21] Appl. No.: 796,406

[22] Filed: May 12, 1977

[51] Int. Cl.[2] .......................... G09F 13/20; B05B 5/00; B32B 3/00

[52] U.S. Cl. ....................................... 428/195; 40/542; 427/157; 427/265

[58] Field of Search .................. 40/134, 135; 428/195, 428/199, 537, 913; 106/21, 23; 427/157, 265, 261

[56] References Cited

U.S. PATENT DOCUMENTS

| | | | |
|---|---|---|---|
| 1,728,731 | 9/1929 | Hayes | 40/134 |
| 2,689,917 | 9/1954 | Switzer | 40/134 |
| 3,426,242 | 4/1969 | Schaffner | 428/195 |
| 3,591,942 | 7/1971 | Swearingen | 40/134 |
| 3,767,517 | 10/1973 | Williams | 428/199 |

*Primary Examiner*—Douglas J. Drummond
*Attorney, Agent, or Firm*—Ernest H. Schmidt

[57] ABSTRACT

Sheet wall covering imprinted with one scene or artistic representation in ordinary ink for viewing under natural or artificial lighting conditions is overprinted with another scene or artistic representation that is visible only in total darkness after first having been exposed to visible light by the use of inks comprising visible-light-actuated, pigmented phosphors in a transparent vehicle. The two scenes or artistic representations printed are interrelated to carry out a common theme when viewed sequentially.

3 Claims, 2 Drawing Figures

DOUBLE IMAGE PRINTED MEMBER

Figure 1:
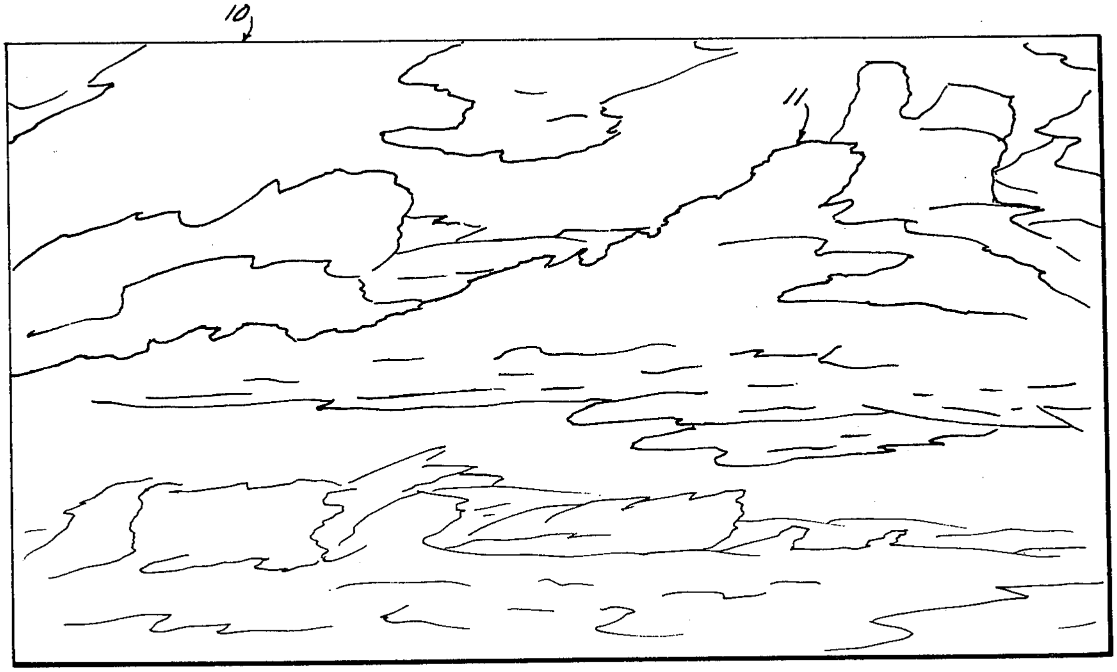

This invention relates to printed materials, and is directed particularly to novel and improved wall covering panels, murals, papers and the like decorative materials wherein one image is observed under ordinary natural or artificial lighting conditions, and another image is observed in phosphorescence when viewed in total darkness.

The principal object of this invention is to provide a double image printed members such, for example, as wall covering materials, greeting cards, printed fabrics and the like, wherein the scene or artistic representation for viewing under natural or artificial lighting conditions is imprinted with ordinary inks, and wherein the scene or artistic representation overprinted thereon for viewing in total darkness is imprinted with light-activated phosphorescent inks comprising pigmented phosphors in a transparent printing vehicle.

A more particular object of my invention is to provide a double image printed member of the character described wherein the two scenes or artistic representations imprinted for separate sequential viewing under natural or artificial lighting, and in total darkness, respectively, will preferably be different in content, but at the same time interrelated in one way or another to carry out a common theme.

Figure 2:
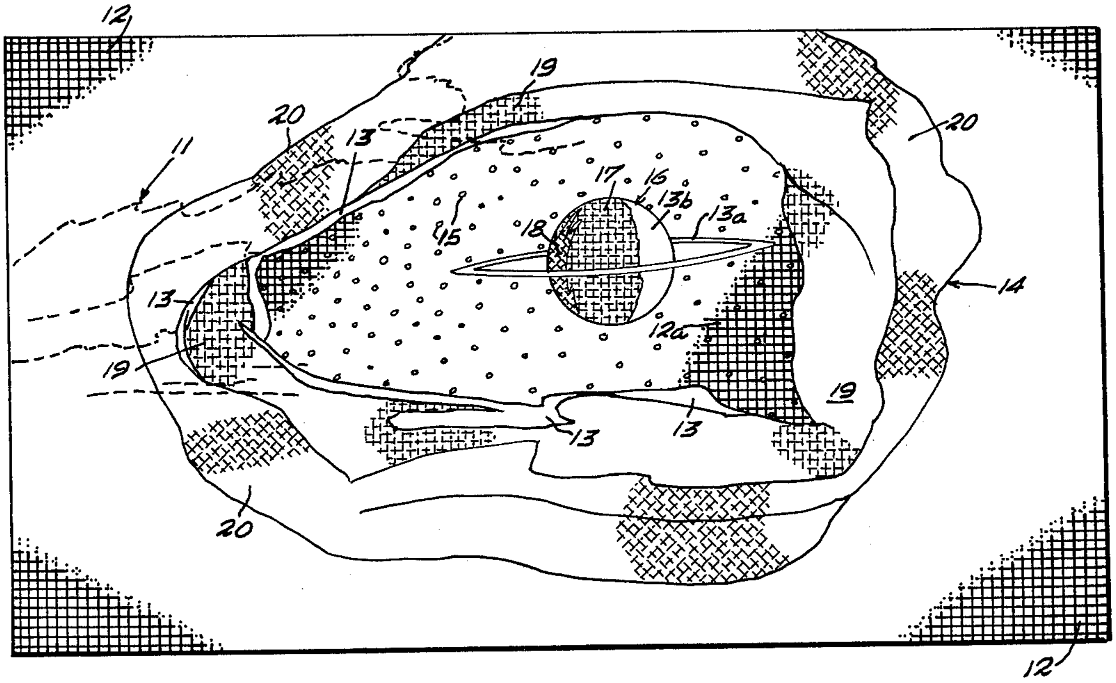

Other objects, features and advantages of the invention will be apparent from the following description when read with reference to the accompanying drawings. In the drawings:

FIG. 1 illustrates a panel of wallpaper embodying the invention as seen under visible light; and FIG. 2 illustrates the same panel illustrated in FIG. 1 as it appears in phosphorescence when observed in the dark after having been exposed for a period of time to natural or artificial light.

Referring now in detail to the drawings, reference numeral 10 designates, generally, a panel of wallpaper or the like upon which is imprinted or otherwise impressed any scene or pictorial representation for ordinary viewing under natural or artificial lighting. As illustrated in FIG. 1, the scene may, for example, be that of clouds in the sky, indicated generally at 11. It is to be understood that this scene is printed with ordinary ink, preferably in color, and that the scene thus depicted will be invisible in the dark, as is the case with ordinary wallpaper. My invention, in essence, comprises the overprinting upon the imprint 11 of the panel 10, of a different scene, visible only in complete darkness, so that, in effect, it replaces the scene visible only under daylight or artificial lighting conditions. To this end a phosphorescent scene, such as a pictorial representation of the night sky as observed through an opening in a cave, is imprinted as an overlay using various phosphors compounded with a transparent vehicle so as to be invisible under natural or artificial light. Thus, as illustrated in FIG. 2 by way of example, reference numeral 14 illustrates, in outline, that area of the overprinting imprinted with phosphorescent inks artistically applied as the scene visible in darkness after first having been exposed for a suitable length of time to visible light. As illustrated in FIG. 2, the peripheral area designated at 12 is representative of an area which is not overlay imprinted, so as to appear as black in total darkness. A central zone 14 of the area containing the phosphorescent scene designated is imprinted with a plurality of small circles of phosphorescent material such as calcium sulfide which, in total darkness, will present a bluish-white glow simulating stars 15 in the black sky field 12*a*.

Centrally located in the black sky field 12*a* is fanciful representation of the planet Saturn, designated by reference numeral 16, circular in peripheral shape and surrounded by a ring 13*a* printed with the same phosphorescent material as the stars 15 to present a bluish-white glow when observed in total darkness. The areas designated 13*b*, 17 and 18 are printed with phosphors giving off bluish-white, yellow-green and orange-red colors, respectively, for simulating light reflection in three-dimensional effect. The cave opening defining the black sky field 12*a* in similar fashion will be bordered by marginal zones 13, 19 and 20 delineating bluish-white, yellow-green and orange-red phosphorescent zones, respectively, simulating graduation in reflected light coloring at the mouth of the cave as seen from the inside. In FIG. 2 the invisible clouds are partially illustrated in phantom outline at 11. In practice I have found powdered calcum sulfide to be a suitable phosphor, in a transparent printing vehicle, for producing the bluish-white coloring, whereas zinc sulfide pigmented with various organic pigments produces the desired tones of yellow-green and orange-red, respectfully, when printed with the clear vehicle. Thus, just as is the daytime or visible light scene of FIG. 1 not visible in total darness, neither is the overlay or overprint scene of FIG. 2 sufficiently phosphorescent as to be visible except under conditions of total darkness. To enhance the overall unique effect created by my invention, it is contemplated that the daylight and total darkness scenes or pictorial representations depicted separately in FIGS. 1 and 2 be interrelated in one way or another as to subject matter. In the illustrated example the daylight visible cloud scene of FIG. 1 is representative of what one might observe looking upwardly from the outside of the cave, whereas FIG. 2 depicts what might fancifully be observed at nighttime while looking outwardly of the mouth of the cave towards the same sky. It will be understood, of course, that these interrelated day and night scenes are presented by way of example only and that numerous other related combinations of interrelated day and nighttime scenes will readily come to mind. It is further to be understood that while I have illustrated my invention as applied to wallpaper, and more particularly in the form of a mural, it is applicable as well to pattern repetition as in ordinary wall covering, or even to other printed matter such as greeting cards and the like. My invention, in brief, comprises all the embodiments and modifications coming with the scope and spirit of the following claims.

What I claim as new and desire to secure by Letters Patent is:

1. A double image printed member comprising, in combination, a panel of sheet material, a first scene or artistic representation printed upon one face of said sheet material panel in ordinary ink for ordinary viewing under natural or artificial visible lighting conditions, and a second scene or artistic representation printed over said first scene or artistic representation and printed in inks comprising light-activated phosphors in a clear vehicle for viewing in total darkness after first having been exposed to visible light, said phosphorescent ink comprising zinc sulphide pigmented with organic pigments, and calcium sulphide pigmented with organic pigments, said organic pigments being of such slight color when observed in ordinary light as to be substantially invisible, whereby said overprint will be substantially invisible when said double image printed panel is viewed under visible light.

2. A double image printed member as defined in claim 1 wherein the two scenes depicted for sequential viewing under natural or artificial lighting and in total darkness, respectively, are not duplicates of one another but are interrelated to carry out a common theme.

3. A double image printed member as defined in claim 1 wherein said sheet material comprises wallpaper.

* * * * *